Figure 1:
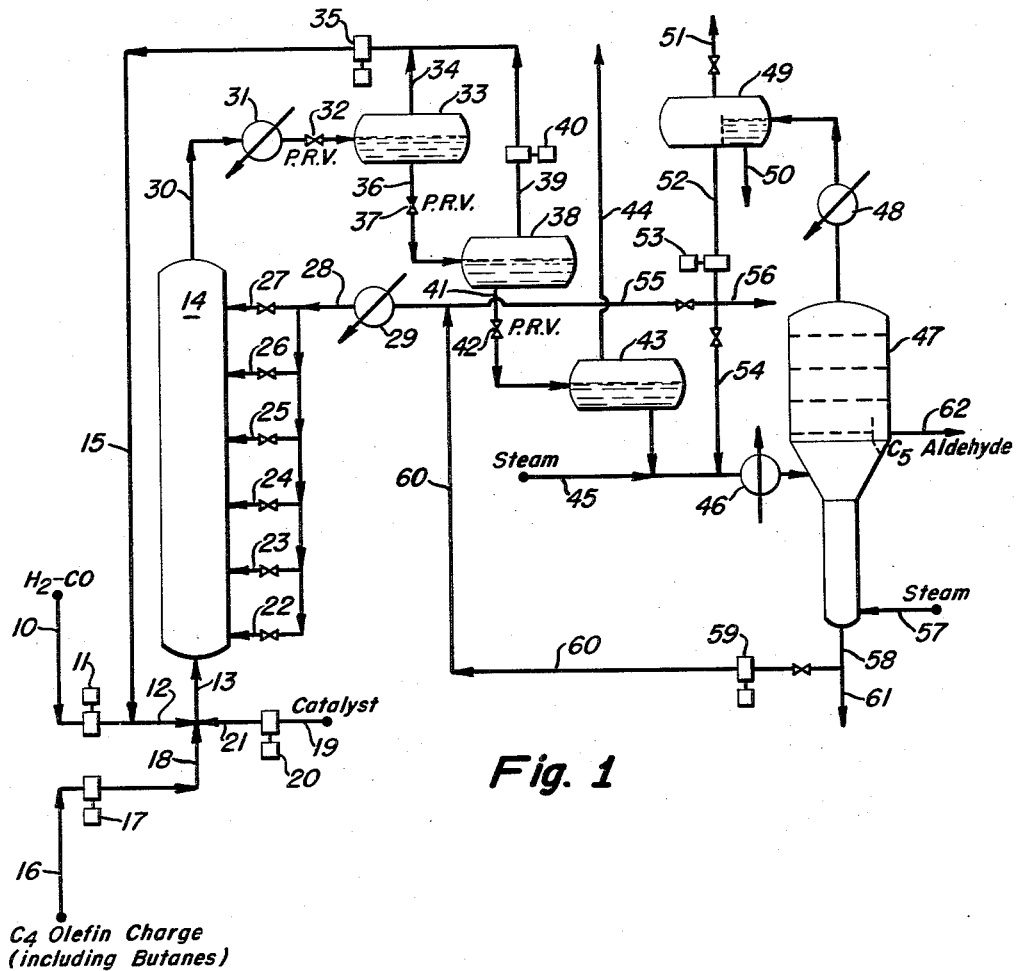

Sept. 2, 1958 W. P. THOMSON 2,850,541
PRODUCTION OF C₅ ALCOHOLS BY IMPROVED OXO PROCESS
Filed Sept. 19, 1955

William P. Thomson
INVENTOR.

BY
*Donald E. Payne*
ATTORNEY

United States Patent Office 2,850,541
Patented Sept. 2, 1958

2,850,541

PRODUCTION OF C₅ ALCOHOLS BY IMPROVED OXO PROCESS

William P. Thomson, Alton, Ill., assignor to Standard Oil Company, Chicago, Ill., a corporation of Indiana Application September 19, 1955, Serial No. 534,906

2 Claims. (Cl. 260—638)

This invention relates to the production of $C_5$ alcohols by an improved oxo process employing a $C_4$ (butylene) charge contaminated with $C_4$ paraffins (butanes) and it pertains more particularly to improvements in the oxolation or carbonylation portion of the system.

The production of high alcohols by the oxo process has been commercially practiced for some time and is described, for example, in U. S. 2,638,487 as applied to $C_7$ and $C_8$ olefin charging stocks. The production of low boiling alcohols such as $C_5$ alcohols from $C_4$ olefins presents a number of problems which are not encountered in the production of higher boiling alcohols. It is difficult and/or expensive to obtain a $C_4$ olefin charge which is free from butanes. The solubility of carbon monoxide and hydrogen is much greater in butanes and butylene than in higher molecular weight hydrocarbons so that much larger quantities of synthesis gas are dissolved in cooled oxolation reactor effluent liquid; the amount of synthesis gas dissolved in such reactor effluent liquid may equal the quantity consumed by the reaction so that it is essential from economic considerations that this large quantity of dissolved synthesis gas be separated from the liquid and recycled. If the liquid is depressured to a low pressure in accordance with prior commercial practice, the cost of repressuring the released synthesis gas becomes excessive. An object of my invention is to solve these problems which are peculiar to the production of $C_5$ alcohols from butane-butylene charging stocks. A further object is to provide an improved method of carbonylating $C_4$ olefins in an oxo process for producing $C_5$ alcohols from a $C_4$ olefin charge containing butanes. A specific object is to minimize compression costs and maximize synthesis gas utilization in the production of $C_5$ alcohols by the oxo process. An ultimate object is to provide an improved economic and commercially feasible process for obtaining $C_5$ alcohols from $C_4$ olefins.

In practicing my invention I employ carbonylation catalyst and conditions of temperature and pressure previously known to those skilled in the art. However, in order to maintain the desired liquid phase conditions in the carbonylation or oxolation reactor, I introduce a coolant liquid at spaced levels, which liquid is substantially free from dissolved synthesis gas and which is preferably obtained as a recycle stream from a subsequent fractionation step. The reactor effluent stream is cooled to as low a temperature as is obtainable by available cooling water, e. g. to about 100° F. and is depressured from a reaction pressure of 2500 to 4000 p. s. i. or more to a pressure in the range of about 700 to 1500 p. s. i. in order to effect separation of most of the synthesis gas from cooled reactor effluent liquid. By depressuring to a pressure in the stated range I reduce the amount of butanes in the separated synthesis gas stream below that which would be obtained by separating at higher pressures and I reduce compression costs over those which would be required if the synthesis gas were separated at lower pressures. Further amounts of synthesis gas may, of course, be separated at lower pressures and at least a part thereof may likewise be recycled. It will thus be noted that the recycled synthesis gas is substantially free from butanes in addition to the fact that the coolant liquid is substantially free from synthesis gas.

After separation of the synthesis gas the gas-free product liquid may be at least partially decobalted, although decobalting is not always essential. The gas-free liquid is preferably heated to a temperature of about 150 to 180° F. and stirred with water or diluent acid, such as 5 percent sulfuric acid, and/or blown with hydrogen or inert gas, it being understood that any known means of decobalting may be employed.

The gas-free carbonylation effluent is next fractionated at reduced pressure in a flash steam distillation zone in order to remove as "polymer" any materials higher boiling than $C_5$ alcohols. Butanes and unreacted olefins are taken overhead, a part of this overhead stream being employed as a heat carrier in the flash steam distillation step, another part being cooled and returned to the carbonylation zone for temperature control and the remainder of the $C_4$ hydrocarbon stream being withdrawn as refinery gas. The so-called polymer may be recycled, cooled and recycled for temperature control in the carbonylation step instead of, or in addition to, the separated $C_4$ hydrocarbon stream from the fractionator.

The heart cut, consisting essentially of $C_5$ aldehydes and alcohols, is hydrogenated with known catalyst under known conditions to convert substantially all of the $C_5$ aldehydes to alcohols and the hydrogenated product is then fractionated to obtain the final $C_5$ alcohol product.

Figure 2:
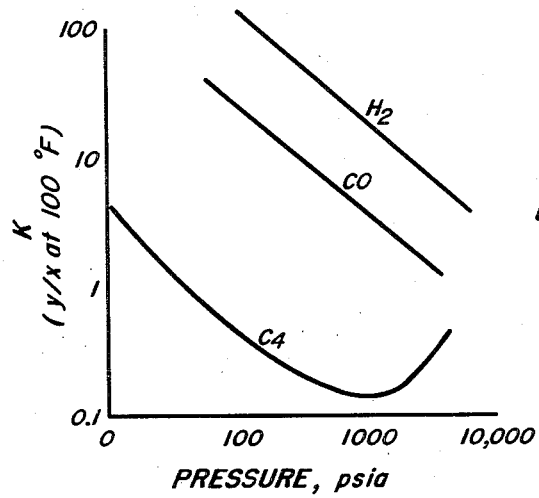

The invention will be more clearly understood from the following detailed description of a specific example thereof read in conjunction with the accompanying drawings which form a part of this specification and in which:

Figure 1 is a schematic flow diagram of that portion of the $C_4$ oxo system to which the present invention relates, and Figure 2 is a log-log plot of equilibrium constants against pressure for hydrogen, carbon monoxide and butanes.

Referring to Figure 1, a hydrogen-carbon monoxide gas mixture in a mol ratio of about 1:1 is introduced from source 10 by compressor 11 and lines 12 and 13 to carbonylation or oxolation reactor 14 together with recycled hydrogen-carbon monoxide synthesis gas which is introduced into line 12 by line 15. A $C_4$ olefin charge is introduced from source 16 by pump 17 and lines 18 and 13 to reactor 14. The olefin charge is preferably a $C_4$ stream such as a butane-butylene stream which is commonly available in petroleum refineries and it may contain about 42 percent of butylenes (a mixture of isobutylene, butene 1 and butene 2) and the balance almost entirely isobutane and normal butane with not more that about 1 or 2 percent of lighter and heavier hydrocarbons. It should be understood, of course, that any individual butene may be employed when available and that the butene or butylenes may be in a much higher state of purity although they usually will contain at least some butane. Catalyst is preferably introduced as an oil-soluble cobalt compound such as cobalt naphthenate or cobalt tallate in butane solution and it may be introduced with the olefin charge or from separate source 19 by pump 20 and line 21.

The oxolation or carbonylation conditions in reactor 14 may be substantially as described in U. S. 2,638,487, i. e. the reactor is preferably maintained at a pressure in the range of 2500 to 4000 p. s. i. g. or more, e. g. 3000 p. s. i. g., the temperature is preferably in the range of about 250 to 400° F. or more, e. g. about 330° F., the liquid space velocity (volumes of olefin charge per hour per volume of reactor space) may be about .15 to 1.5 or approximately 0.5 and the amount of catalyst may be of the order of .01 to .2 or about .1 weight percent catalyst as cobalt, likewise based on olefin charge. The amount of fresh synthesis gas may be of the order of 20 to 60 cubic feet per gallon of olefin charged, the use of the larger amounts heretofore required being avoided by the gas recycle features of the invention.

Oxalation temperature is stabilized by the large liquid content of the reactor and is preferably controlled by introducing, at spaced levels through lines 22, 23, 24, 25, 26 and 27, a substantially gas-free liquid from line 28 which has been cooled in cooler 29. The preferred liquid for temperature control is that obtained from a subsequent fractionation step as will hereinafter be described.

The reactor effluent is withdrawn through line 30 to heat exchanger 31 wherein it is cooled to temperatures attainable with available condenser water, i. e. to about 100° F. The cooled liquid then passes through pressure-reducing valve 32 and thence to separator 33 which is preferably operated within a pressure range of about 700 to 1500 p. s. i., i. e. at about 1000 p. s. i. The importance of effecting separation within this particular pressure range is demonstrated by Figure 2 which is a log-log plot of equilibrium constants ranging from .1 to 100 against pressures in the range of 100 to 10,000 p. s. i. for hydrogen, carbon monoxide and butanes. From this plot it will be seen that as the pressure is reduced from reaction pressure down to about 1000 p. s. i. the equilibrium constants for hydrogen and carbon monoxide increase while that for $C_4$ paraffin decreases. As the pressure is reduced below about 1000 p. s. i. the equilibrium constants for hydrogen and carbon monoxide continue to increase while that for the $C_4$ paraffin remains nearly constant to about 700 p. s. i. and then starts to increase as pressures become lower and lower. Thus, the volatilities of hydrogen and carbon monoxide, relative to butanes, increase rapidly while reducing the pressure down to the order of 1000 p. s. i. and less rapidly as the pressure is reduced below 700 p. s. i. The volume of gas evolved from oxalation effluent will increase rapidly as the pressure is reduced from 3000 to about 1000 to 700 p. s. i. and less rapidly as the pressure is reduced below 700 p. s. i. The presence of aldehydes and alcohols will, of course, have some effect on the relative volatilities in this system but a considerable portion of the synthesis gas dissolved in oxalation effluent can be removed in a separation step operated in the range of 1500–700 p. s. i. The synthesis gas remaining in the liquid effluent from this stage can be removed in subsequent separation stages operated at still lower pressures. The advantage of operating in this manner is that a considerable portion of the dissolved synthesis gas is recovered at a relatively high pressure level so that the energy required for compressing the recycle gas to reaction pressure is minimized and, at the same time, a minimum amount of butanes is returned with the recycled gas. Thus the synthesis gas withdrawn from separator 33 through line 34 is compressed by compressor 35 and recycled by line 15 to the inlet of reactor 14 without returning thereto appreciable amounts of butanes.

The liquid effluent which leaves separator 33 through line 36 still contains appreciable amounts of dissolved synthesis gas and it is further depressured in pressure-reducing valve 37 and introduced into separator 38 which in this example is operated at a pressure of about 100 to 200 p. s. i. The additional gas which separates at this lower pressure may be withdrawn through line 39 and compressed by compressor 40 for admixture with gas withdrawn through line 34 which is recycled by compressor 35.

Liquid withdrawn from separator 38 through line 41 may be depressured still further in pressure-reducing valve 42 and introduced into final separator 43 from which any remaining gas may be vented from the system through line 44. The reactor liquid may be decobalted by any known means (not shown) at this stage although it does not appear essential that complete decobalting be effected.

The gas-free reactor effluent withdrawn from the bottom of separator 43 is introduced together with steam from line 45 through heater 46 to steam-flash distillation tower 47 which is operated under conditions for distilling overhead all $C_4$ hydrocarbons and lighter components, the overhead being condensed in exchanger 48 and introduced into receiver 49 from which water may be withdrawn through line 50 and any gas (usually none present) may be withdrawn through line 51. The condensed $C_4$ hydrocarbons are withdrawn from receiver 49 through line 52 by pump 53. Part of this stream may be introduced by line 54 to the stream entering the fractionator for providing heat carrier liquid and minimizing the required amount of steam. Another part of the $C_4$ stream is introduced by line 55 through cooler 29 and is introduced at spaced levels and in controlled amounts through lines 22 to 27 for controlling the temperature in the oxalation reactor 14. The remaining amount of the $C_4$ stream is withdrawn from the system through line 56.

Steam is introduced through line 57 at the narrowed base portion of fractionator 47 to strip out all $C_4$ aldehyde and alcohol from the bottoms or "polymer" which is withdrawn through line 58. This bottom stream may be returned by pump 59 through line 60 and exchanger 29 to serve as temperature control liquid in reactor 14 instead of or in addition to the $C_4$ hydrocarbon stream introduced through line 55. The net production of bottoms or "polymer" is withdrawn from the system through line 61.

The heart cut $C_5$ aldehyde-alcohol fraction is withdrawn from the fractionator through line 62 for hydrogenation to $C_5$ alcohol and final fractionation. This portion of the system requires no detailed description since it is analogous to the corresponding portion of the system described in Figure 2 of U. S. 2,638,487, the dehydrogenation catalyst and conditions for hydrogenating $C_5$ aldehydes being well known to those skilled in the art.

From the foregoing description it will be apparent that I have provided a unique oxalation system for $C_4$ olefins which attains the objects of my invention. The depressuring of cooled reactor effluent to a pressure in the range of 700 to 1500 p. s. i. enables recovery and utilization of the large amount of synthesis gas inevitably dissolved in reactor effluent and it effects a marked saving over the expense that would be required for effecting such separation at low pressure. By recycling a liquid stream from the fractionator to serve as temperature control liquid in the reactor, I ensure the maintenance of the desired liquid phase conditions in the reactor. Any catalyst not removed in a cobalting step is largely concentrated in the bottoms or polymer and may be returned to the reactor by recycling this bottoms or polymer fraction as a temperature control liquid.

Although a particular example of my invention has been described in considerable detail, it should be understood that alternative arrangements and conditions will be apparent from the above description to those skilled in the art.

I claim:

1. In the process of making $C_5$ alcohols from $C_4$ olefins by the oxo process, the improved method of operation which comprises introducing a $C_4$ olefin charge into an oxalation zone maintained under carbonylation conditions and also introducing thereto cobalt catalyst and both fresh and recycled $H_2$ plus CO synthesis gas, maintaining a liquid phase of controlled temperature in the oxalation zone by introducing $C_4$ hydrocarbons thereto at spaced levels as a coolant liquid which is substantially free from dissolved synthesis gas, cooling the effluent stream from the oxolation zone to a temperature of about 100° F. and depressuring said stream to a pressure in the range of about 700 to 1500 p. s. i., compressing and recycling gas separated from the stream at the pressure in said range, removing substantially all remaining synthesis gas from said stream at lower pressure, then fractionating said stream to obtain a $C_5$ aldehyde-alcohol fraction for subsequent hydrogenation, a bottoms fraction and an overhead fraction which is condensed and separated from water to give a liquid $C_4$ hydrocarbon stream and recycling a part of said liquid $C_4$ hydrocarbon stream through a cooling zone to spaced levels in the oxolation zone to serve as said coolant liquid for controlling the temperature of said zone.

2. The method of claim 1 which includes the step of recycling a part of the bottoms from the fractionation step through said cooling zone to spaced levels in the oxolation zone.

References Cited in the file of this patent

UNITED STATES PATENTS

| | | |
|---|---|---|
| 2,557,701 | Smith et al. | June 19, 1951 |
| 2,637,746 | Parker | May 5, 1953 |
| 2,686,206 | Cerveny | Aug. 10, 1954 |
| 2,706,206 | Owen et al. | Apr. 12, 1955 |
| 2,744,939 | Kennel | May 8, 1956 |

FOREIGN PATENTS

| | | |
|---|---|---|
| 702,195 | Great Britain | Jan. 13, 1954 |
| 702,217 | Great Britain | Jan. 13, 1954 |
| 702,222 | Great Britain | Jan. 13, 1954 |
| 702,242 | Great Britain | Jan. 13, 1954 |